United States Patent [19]

Balarin

[11] Patent Number: 5,954,792
[45] Date of Patent: Sep. 21, 1999

[54] METHOD FOR SCHEDULE VALIDATION OF EMBEDDED SYSTEMS

[75] Inventor: Felice Balarin, Berkeley, Calif.

[73] Assignee: Cadence Design Systems, Inc., San Jose, Calif.

[21] Appl. No.: 08/774,535

[22] Filed: Dec. 30, 1996

[51] Int. Cl.⁶ ..................................................... G06F 9/00
[52] U.S. Cl. ......................................................... 709/102
[58] Field of Search ........................... 364/200; 395/575, 395/650, 706; 709/102, 103, 104, 107; 712/244

[56] References Cited

U.S. PATENT DOCUMENTS

| | | | |
|---|---|---|---|
| 4,642,756 | 2/1987 | Sherrod | 364/200 |
| 4,792,890 | 12/1988 | Blair et al. | 364/200 |
| 5,012,409 | 4/1991 | Fletcher et al. | 364/200 |
| 5,136,705 | 8/1992 | Stubbs et al. | 395/575 |
| 5,210,872 | 5/1993 | Ferguson et al. | 395/650 |
| 5,392,429 | 2/1995 | Agrawal et al. | 395/650 |
| 5,768,594 | 6/1998 | Blelloch et al. | 395/706 |

OTHER PUBLICATIONS

Ha, Rhan et al., "Validating Timing Constraints in Multiprocessor and Distributed Real–Time Systems," Proceedings of the 14th International Conference on Distributed Computing Systems, Ponzan, Poland, Jun. 21–24, 1994, Institute of Electrical and Electronics Engineers, pp. 162–171.

Saksena, Manas C. et al., "Temporal Analysis for Hard Real–Time Scheduling," Proceedings of the 12th International Phoenix Conference on Computers and Communications, Tempe, Arizona, Mar. 23–26, 1993, Institute of Electrical and Electronics Engineers, pp. 538–544 (see p. 539, right–hand col., line 1 and p. 542, left–hand col., line 10).

Stoyenko, Alexander D., "A Schedulability Analyzer for Real–Time Euclid," Proceedings of the Real Time Systems Symposium, San Jose, California, Dec. 1–3, 1987, Institute of Electrical and Electronics Engineers, pp. 218–227.

Xu, Jia et al., "On Satisfying Timing Constraints in Hard–Real–Time Systems," IEEE Transactions on Software Engineering, vol. 19, No. 1, pp. 70–84, Jan. 1993.

Xu, Jia et al., "Schedule Processes with Release Times, Deadlines, Precedence, and Exclusion Relations," IEEE Transactions on Softward Engineering, vol. 16, No. 3, pp. 360–369, Mar. 1990.

Rajeev Alur, Thomas A. Henzinger, "Selective Quantitative Analysis and Interval Model Checking: Verifying Different Facets of a System", *Computer Aided Verification*, 8th Internatioinal Conference, CAV'96, New Brunswick, NJ, USA, Springer Editor, Jul. 31 to Aug. 3, 1996, pp. 257 to 68.

Neil C. Audsley, Alan Burns, M. Richardson, Ken W. Tindell, and Andy J. Wellings, "Applying new scheduling theory to static priority pre–emptive scheduling." *Software Engineering Journal*, pp. 284 to 292, Sep. 1993.

Neil C. Audsley, Ken W. Tindell, and Alan Burns. "The end of the line for static cyclic scheduling?" *Proceedings of the 5th Euromicro Workshop on Real–Time Systems*, pp. 36 to 41, Oulu, Finland, 1993.

Felice Balarin, "Schedule validation for embedded reactive real–time systems," in preparation, 1996, pp. 1 to 16.

(List continued on next page.)

*Primary Examiner*—Alvin E. Oberley
*Assistant Examiner*—Yveste G. Cherubin
*Attorney, Agent, or Firm*—Townsend and Townsend and Crew LLP

[57] ABSTRACT

Efficient methods for verifying the timing behavior of a system in which various tasks are executed on a processor, and each task is enabled (i.e., becomes ready to execute) in response to the occurrence of an external event and/or the completion of another task. The methods are computationally efficient, requiring an execution time that is polynomial in the number of tasks in the system. The methods can be used in complementary fashion with more computationally intensive techniques for timing behavior verification, such as simulation or prototyping, by limiting the use of such techniques to those systems whose correctness is not proven by the methods.

6 Claims, 5 Drawing Sheets

OTHER PUBLICATIONS

Felice Balarin, Harry Hsieh, Attila Jurecska, Luciano Lavagno, and Alberto Sangiovanni–Vincentelli. "Formal verification of embedded systems based on CFSM networks." In *Proceedings of the 33th ACM/IEEE Design Automation Conference*, Jun. 1996, 4 pages.

Felice Balarin, Karl Petty, Alberto L. Sangiovanni–Vincentelli, and Pavin Varaiya. "Formal verification of the PATHO real–time operating system." In *Proceedings of 33rd Conference on Decision and Control CDC'94*, Dec. 1994.

Jin–Young Choi, Insup Lee, and Hong–Liang Xie. "The specification and schedulatity analysis of real–time systems using acsr." In *Proceedings of IEEE Real–Time Systems Symposium*, pp. 266 to 275. IEEE Computer Society Press, Dec. 1995.

Thoms H. Cormen, Charles E. Leiserson, Ronald L. Rivest, "Depth–first search," Chapter 23.3, *Introduction to Algorithms*, The MIT Press, McGraw–Hill Book Companypp. 477 to 487.

Michael R. Garey, David S. Johnson, "Computers and Intractability, a Guide to the Theory of Np–Completeness", W.H. Freeman and Company, New York, pp. 90 to 95.

Richard Gerber, Seongsoo Hong, and Manas Saksena. "Guaranteeing end–to–end timing constraints by calibrating intermediate processes." In *Proceedings of IEEE Real–Time Systems Symposium*, pp. 192 to 203. IEEE Computer Society Press, Dec. 1994.

Michael Gonzalez Harbour, Mark H. Klein, and John Lehoczky. "Timing analysis for fixed–priority scheduling of hard real–time systems." IEEE *Transaction of Software Engineering*, 20(1), Jan. 1994, pp. 13 to 28.

C. L. Liu and James W. Layland. "Scheduling algorithms for multiprogramming in a hard real–time environment." *Journal of the Association for Computing Machinery*, 20(1):46–61, Jan. 1973.

P. McGeer, A. Saldanha, R. Brayton, and A. Sangiovanni–Vincentelli. "Delay models and exact timing analysis." In T. Sasao, editor, *Logic synthesis and optimization*. Kluwer Academic Publishers, 1993, pp. 167 to 189.

Marco Spuri and John A. Stankovic. "How to integrate precedence constraints and shared resources in real–time scheduling." IEEE *Transactions on Computers*, 43(12):1407–12, 1994, reprinted as pp. 1 to 17.

METHOD FOR SCHEDULE VALIDATION OF EMBEDDED SYSTEMS

BACKGROUND OF THE INVENTION

The present invention relates to the verification of the timing behavior in embedded systems. More particularly, the invention provides techniques for determining whether it is impossible for an event to be dropped in such a system.

Embedded systems, i.e., systems embedded in the equipment they serve, typically consist of several interacting components that constantly monitor and react to various conditions (sometimes referred to as "external events") in their respective environments. Due to flexibility and cost-efficiency, many of these components are often implemented in software and executed on a controller (i.e., processor) for the system. Each component is implemented as a software task (sometimes referred to as an "internal task"), and an operating system is used to schedule execution of tasks. Embedded systems are being increasingly used for a variety of products, including low-cost high-volume consumer products.

FIG. 1A illustrates a typical environment for an embedded system. An apparatus 10 includes an embedded system 11, a sensor 12, and an actuator 13. Embedded system 11 includes a processor 14 and a storage medium 15. Storage medium 15 stores one or more tasks 16 which execute on processor 14.

Sensor 12 sends signals to system 11 indicating the occurrence of one of a set of one or more external events. Typically, sensor 12 monitors one or more characteristics of the environment of apparatus 10 (such as temperature or pressure) and each of one or more of the external events occurs whenever sensor 12 detects that the environment of apparatus 10 is in a particular state. Other external events may occur whenever sensor 12 detects a condition unrelated to the environment of apparatus 10 (such as expiration of a timeout period).

Each of tasks 16 becomes ready for execution upon the occurrence of any of one or more of the external events and/or upon the completion of execution of any of one or more of tasks 16. One or more of tasks 16 cause processor 14 to send digital data to actuator 13 which takes some physical action in response to the data received (such as moving a component in apparatus 10, changing a characteristic of the environment of apparatus 10 such as temperature or pressure, providing a voltage or current, etc).

To verify the correctness of software tasks in an embedded system, one must verify their functionality and their timing behavior. The timing behavior depends on timing properties of tasks and external events, as well as the scheduling policy: i.e., the set of rules determining which task to execute on the processor, if more than one task is ready to run. Consequently, the timing verification problem for such systems is sometimes referred to as the schedule validation problem. Given that embedded systems are becoming more complex and controlling ever more critical processes, schedule validation is becoming a dominant consideration in embedded system design beside cost, performance, and power consumption.

Each internal task is enabled (i.e., ready to commence execution) upon the occurrence of one or more external events, and/or upon the completion of one or more of the other internal tasks. Each external event is hereinafter described as the completion of an external task (whose duration, unlike that of an internal task, is of no relevance to the timing verification issues discussed herein). An embedded system is said to include an event (i,j) if completion of task i enables internal task j. Event (i,j) is referred to as internal or external depending on whether task i is internal or external. One aspect of schedule validation involves determining whether or not an event can be dropped. Event (i,j) can be dropped if in some execution of the embedded system it is possible, after task i completes execution, for task i to complete execution again before task j completes execution.

Dropping certain events (designated as "critical") may not be acceptable. For example, an embedded system used to calculate the speed of a wheel from a counter keeping track of the number of wheel revolutions, might include an external task i that completes execution once every revolution of the wheel by sending a signal to the system controller, and an internal task j that is enabled upon every completion of the external task and whose purpose is to increment the counter by one. If event (i,j) is dropped, in other words if two completions of external task i (i.e., two revolutions of the wheel) occur without an intervening completion of internal task j, the first wheel revolution will not result in an increment to the counter, and thus an incorrect wheel speed will be computed.

The timing behavior of an embedded system is verified to be correct (i.e., the schedule of the embedded system is proved valid) if it is determined that none of the critical events in the embedded system can be dropped. Two of the most widely used methods for schedule validation are simulation and prototyping. In prototyping, a physical model of an embedded system is built, typically comprising a microprocessor or micro-controller, memory, and some interface circuitry. The prototype is then exercised with some set of input sequences of external events, and the outputs of the system are monitored for correctness. Simulation is similar, except that hardware components (microprocessor, memory, etc,) are replaced with corresponding simulation models.

Because there are an infinite number of possible input sequences of external events to an embedded system, prototyping and simulation are techniques that cannot prove schedule validity. Thus, even if the system behaves correctly for all sequences in the test set, there are no guarantees that the system will behave correctly for all other input sequences. In other words, using these methods, a schedule can be proved invalid, but it can never be proved valid.

Several techniques of general applicability have been proposed for analytically determining whether a schedule of an embedded system is valid. However, these techniques require an execution time that grows exponentially with the size of the embedded system (i.e., number of tasks), and are thus impractical for all but the smallest embedded systems.

Yet other computationally tractable but less general schedule validation techniques have been proposed. In particular, each of these techniques can, at most, only be applied to embedded systems satisfying the following constraints:

(a) completion of each task enables at most one other internal task. This constraint severely limits the ability to share information between the system tasks, because completion of any task can trigger the execution of at most one other task.

(b) each internal task is enabled by the completion of exactly one other task. This constraint severely limits the ability to realistically model reactive real-time systems, because such systems usually include one or more components that are executed in response to any one of two or more events in their environment.

(c) an internal task is not allowed to execute whenever any of its successor tasks are enabled (a task is a successor to a given task if the task is enabled by the completion of the given task). This constraint makes it impossible for internal events to be dropped, and may, for example, be unsuitable for systems having urgent tasks that must be executed promptly even if one or more of their successor tasks are enabled.

What would be desirable is an efficient analytical technique of general applicability for proving that an event cannot be dropped in any execution of an embedded system.

SUMMARY OF THE INVENTION

The present invention provides efficient methods for verifying the timing behavior of a system in which various tasks (herein referred to as "internal" tasks) are executed on a processor, and each task is enabled (i.e., becomes ready to execute) in response to the occurrence of an external event (herein referred to as "completion" or "execution" of an "external task") and/or the completion of another task.

One of the methods can be used to determine, given that in the system completion of a first task enables a second task and static priority scheduling is used to schedule tasks for execution on the processor, whether it is impossible (over all executions of the system) after the first task completes execution for the first task to complete execution again before the second task completes execution.

Another one of the methods can be used to determine, given that in the system occurrence of an external event enables a task and preemptive static priority scheduling is used to schedule tasks for execution on the processor, whether it is impossible (over all executions of the system) after the external event occurs for the external event to occur again before the task completes execution.

Yet another one of the methods can be used to determine, given that in the system occurrence of an external event enables a task and non-preemptive static priority scheduling is used to schedule tasks for execution on the processor, whether it is impossible (over all executions of the system) after the external event occurs for the external event to occur again before the task completes execution.

Each of the methods is computationally efficient, requiring an execution time that is polynomial in the number of tasks in the system. The methods are of general applicability and can be used in complementary fashion with more computationally intensive techniques for timing behavior verification, such as simulation or prototyping, by limiting the use of such techniques to those systems whose correctness is not proven by the methods.

A further understanding of the nature and advantages of the present invention may be realized by reference to the remaining portions of the specification and the drawings.

DESCRIPTION OF SPECIFIC EMBODIMENTS

Basic Definitions and Notation

An embedded system (hereinafter referred to as a system) consists of a single processor and a set of tasks with known priorities and execution times that execute on the processor. Tasks are enabled either by external events or by execution of other tasks (internal events). Among the enabled tasks, the one with highest priority is executed first. It is assumed that there exists some known minimum time between two occurrences of the same kind of external event. A system is correct if certain critical events are never "dropped", i.e., if tasks enabled by these events are executed before another event of the same kind occurs.

More precisely, a set of internal tasks in the system is denoted by T and the execution time of some task $i \in T$ is denoted by $\epsilon(i)$. Internal tasks are identified by their priorities, i.e., $T=\{1,2, \ldots, n\}$. Task n has the highest priority and task 1 has the lowest. A set of external tasks is denoted by U, and the minimum time between two executions of some task $i \in U$ is denoted by $\mu(i)$. The duration of execution of external tasks is of no relevance to the issues discussed herein. Thus, the phrase "execution of an external task" refers to completion of an execution of that external task.

Events are denoted by ordered pairs (i,j) where j is an internal task and i is either an internal task (in which case the event is said to be "internal"), or external task (in which case the event is said to be "external"). The set of all events in the system is denoted by E, and some events in E are designated as critical (i.e., it is unacceptable to drop these events). A graph with nodes corresponding to all the internal and external tasks (T∪U) and directed edges E is referred to as the system graph for the system. The techniques disclosed herein assume that the system graph is acyclic.

An execution of a system using preemptive static priority scheduling is any timed sequence of events that satisfies the following:

external tasks can execute at any time, as long as the time between two executions of any external task i is larger than or equal to $\mu(i)$, immediately after the execution of task i, all the tasks j such that $(i,j) \in E$, are enabled, and task i is disabled, internal tasks can execute only if they are enabled, initially, no tasks are enabled, and at any time, if more than one internal task is enabled, the enabled task having the highest priority executes on the processor at that time.

An event (i,j) is said to be dropped if after i is executed, task i is executed again before task j is executed. An execution is correct if no critical events are dropped in it. A system is correct if all of its executions are correct.

Figure 1A:
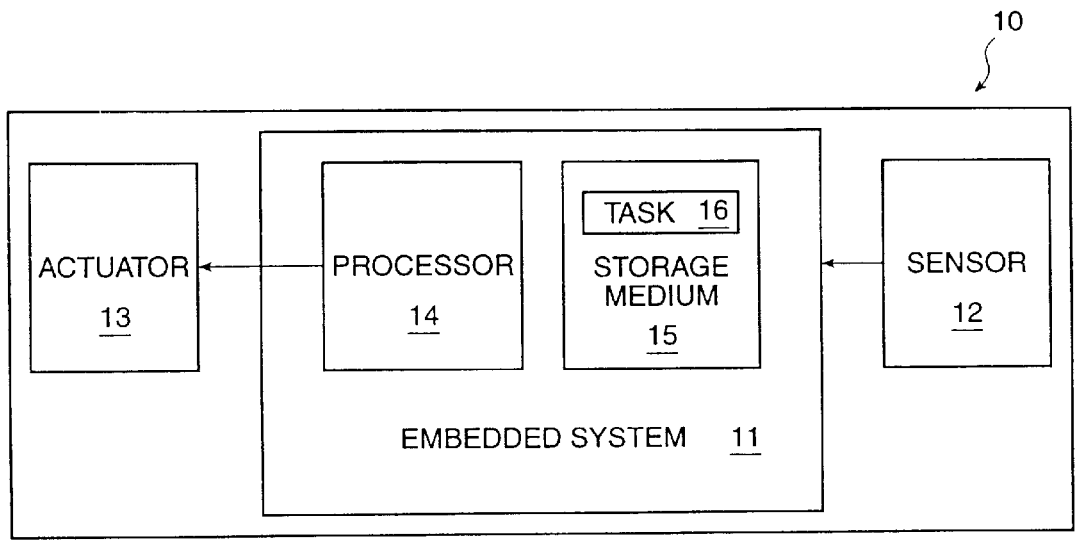
FIG. 1A illustrates a typical environment for an embedded system.
Figure 1B:
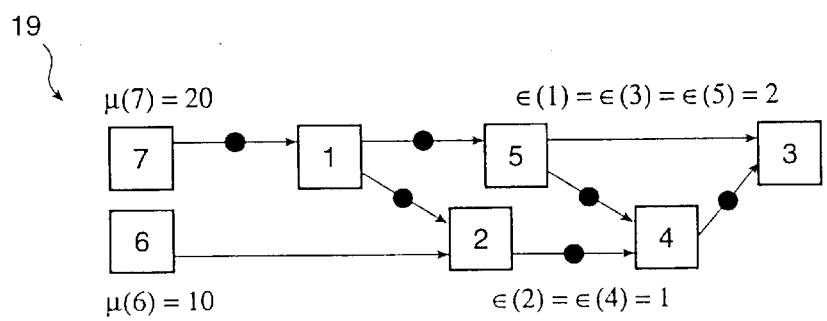
FIG. 1B illustrates an example of an embedded system.
Figure 1C:
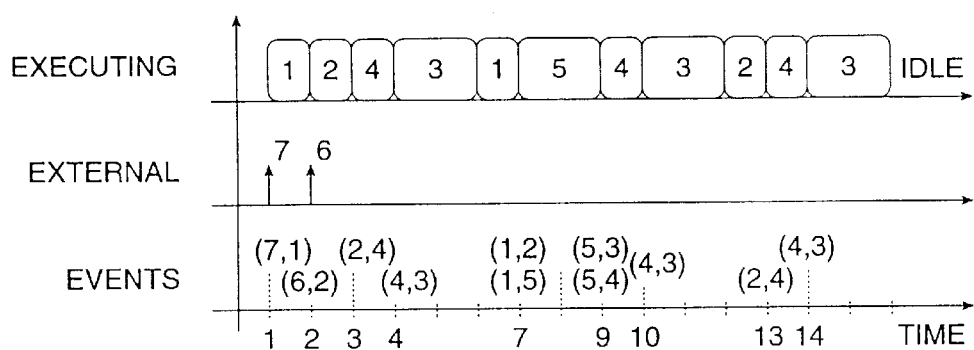
FIG. 1C illustrates a possible execution of the system of FIG. 1B.

FIG. 1B illustrates a graph for the tasks of an embedded system 19. Embedded system 19 has five internal tasks (1–5)

and two external tasks (6,7). Embedded system 19 also has total of eight events, two of which are external ((7,1), (6,2)). Six events are critical, as indicated by black dots. FIG. 1C illustrates a possible execution of the system of FIG. 1B. In FIG. 1C, executions of external tasks are represented by upward arrows, while executions of internal tasks are represented by rounded boxes.

This invention provides schedule validation methods for preemptive and non-preemptive versions of static priority scheduling. With both types of scheduling, if the processor is idle, then the task with the highest priority among enabled tasks is executed. With preemptive scheduling, an executing task is suspended if a higher priority task becomes enabled. With non-preemptive scheduling, however, once a task is selected for execution, it is run until completion, even if some higher priority tasks become enabled in the meanwhile. Preemptive static priority scheduling has attracted a lot of attention due to its elegant theoretical properties and good service of urgent tasks. However, non-preemptive priority scheduling is often used in practice due to significantly simpler implementation and lower execution time overhead.

Several of the techniques described below can be used to determine if it is impossible for a particular event to be dropped. Each of these techniques terminates by providing one of two indications. One of the indications (sometimes referred to as "success") is provided when the technique determines that it is impossible for the particular event to be dropped. The other indication (sometimes referred to as "failure") is provided when the technique is unable to determine that it is impossible for the particular event to be dropped. Providing an indication is meant to include providing data to an output device (such as a printer or monitor) for display to a user, communicating data to another computer program (e.g. a program for automated system design that continues to make changes to a proposed design until an indication of success is received) and providing data to be written into a storage medium and later accessed by a user or a computer program.

Dropping Internal Events

Figure 2:
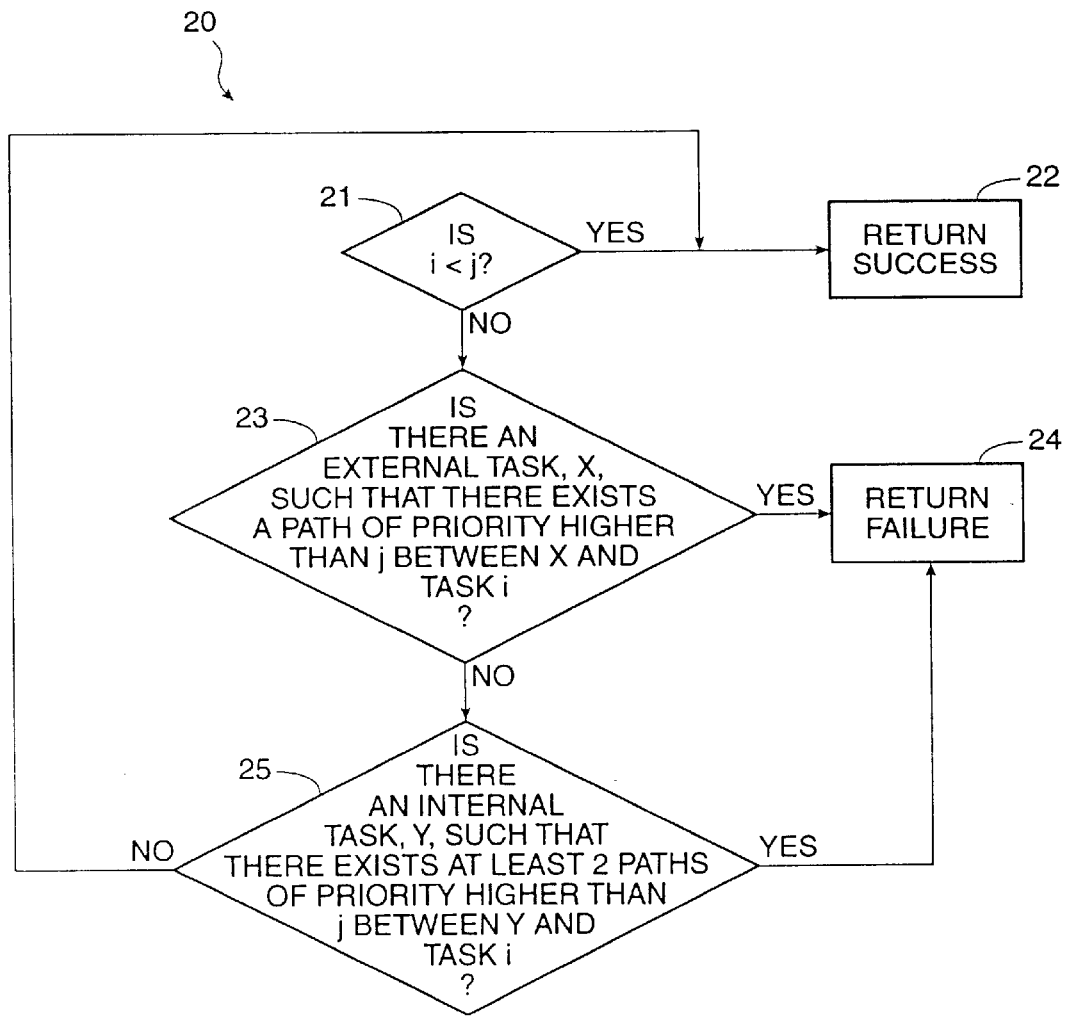
FIG. 2 is a flowchart for a technique to determine whether it is impossible to drop a particular internal event in a system.

FIG. 2 is a flowchart for a technique 20, applicable to systems using either preemptive or non-preemptive static priority scheduling, for determining whether it is impossible for internal event (i,j) to be dropped. When referring herein to a path between two nodes, the path is taken to not include the two nodes.

Initially, i is compared to j (step 21). If i is less than j, then it is determined that event (i,j) cannot be dropped (step 22).

Otherwise, it is determined whether there exists an external task, X, in the system such that there exists a path in the system graph between the nodes representing X and internal task i, respectively, such that each of the nodes on the path represents an internal task of priority higher than j (step 23). Such a path is referred to as a path of higher priority than j. If such external task is found, then processing terminates with an inconclusive result, i.e., it may or may not be possible for event (i,j) to be dropped (step 24).

Otherwise, it is determined whether there exists an internal task, Y, in the system such that there exists at least two paths in the system graph between the nodes representing Y and internal task i, respectively, such that each of the nodes on each of the paths represents an internal task of priority higher than j (step 25). If no such internal task is found, then it is determined that event (i,j) cannot be dropped (step 22). Otherwise, processing terminates with an inconclusive result, i.e., it may or may not be possible for event (i,j) to be dropped (step 24).

The technique depicted in FIG. 2, would determine that event (4,3) cannot be dropped in the system represented by the graph of FIG. 1B because each of steps 21, 23, and 25 returns a NO.

Step 21 returns a NO because 4 is not less than 3.

Step 23 returns a NO because:
(a) neither of the paths (i.e., 1→2, and 1→5) between the nodes representing external task 7 and internal task 4, respectively, is a path of higher priority than 3 (each path includes a node representing a task having a priority less than 3); AND
(b) the single path (i.e., 2) between the nodes representing external task 6 and internal task 4, respectively is not a path of higher priority than 3 (there is a node representing a task having a priority less than 3).

Step 25 returns a NO because there is only one internal task (i.e., 1), such that there is more than one path (i.e., 2, and 5) between the nodes representing the internal task and task 4, respectively, and only one of the paths (i.e., 5) is a path of higher priority than 3 (contains only nodes of priority greater than 3).

The following pseudocode (proc 1) could be used to traverse the system graph in order to implement the flowchart of FIG. 2 (a node representing task i is defined to be a predecessor node of a node representing task j, if (i,j) is an event of the system):

```
PROC1 (input: (i,j) an internal event)
1.  if i < j then RETURN SUCCESS
2.  mark the node representing i
        TO_BE_PROCESSED and VISITED
    while the node representing
    some task current is marked
        TO_BE_PROCESSED
3.      remove TO_BE_PROCESSED mark from the
            node representing current
        for each predecessor node pred of the node
            representing current
4.          if the node representing pred is marked
                VISITED then RETURN FAILURE
5.          if pred is an external task then
                RETURN FAILURE
6.          mark the node representing pred VISITED
7.          if pred>j then mark the node representing pred
                TO_BE_PROCESSED
        end for each
    end while
8.  RETURN SUCCESS
    end PROC1
```

If the above procedure returns SUCCESS (steps 1 or 8), then it has been determined that event (i,j) cannot be dropped. If it returns FAILURE, then the result is inconclusive: it may or may not be possible for event (i,j) to be dropped.

PROC1 intermingles the performance of steps 23 and 25 of FIG. 2 as the nodes are traversed. If the node representing task pred is determined to be marked VISITED at line 4, then pred represents an internal task that satisfies the condition in step 25 of FIG. 2. If task pred is determined to be an external task at line 5, then pred represents an external task that satisfies the condition in step 23 of FIG. 2. The time required to execute PROC1 is polynomial in the number of system tasks.

Figure 3:
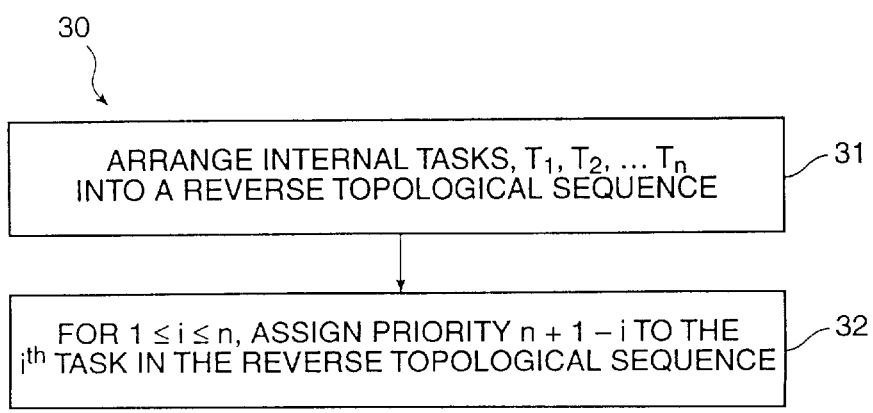
FIG. 3 is a flowchart for a technique to assign priorities to the internal tasks of a system so as to ensure that no internal events can be dropped.

FIG. 3 depicts a flowchart for a technique 30 to assign priorities to the internal tasks of a system so as to ensure that no internal events can be dropped. Thus, FIG. 3 illustrates a technique for building correctness into the system at the time of design as opposed to later verification of correctness. Initially, the internal tasks are arranged in a reverse topological sequence (step 31). In such a sequence, any first task appears before any second task if completion of the second task enables the first task.

There may exist several possible reverse topological sequences of the internal tasks. For example, there are two possible reverse topological sequences for the internal tasks of FIG. 1B, i.e., tasks 3, 4, 2, 5, 1 and tasks 3, 4, 5, 2, 1. Computationally efficient techniques for traversing a directed graph in order to determine a topological sequence are well known in the art. For example, see *Introduction to Algorithms*, Cormen et al., MIT Press, pages 477–487, hereby incorporated by reference.

After the internal tasks are arranged in a reverse topological sequence in step 31, priority n+1−i is assigned to the ith task in the reverse topological sequence, for 1=<i=<n, where n is the number of internal tasks (step 32). Alternatively, step 32 can be replaced with any assignment of priorities that decreases throughout the sequence. The technique of FIG. 3, as applied to the system of FIG. 1B, could determine the following reverse topological sequence in step 31: tasks 3, 4, 2, 5, 1. Then in step 32, the technique would assign priorities 5, 4, 3, 2, and 1 to tasks 3, 4, 2, 5, 1, respectively.

Dropping External Events

Before describing the techniques below for determining whether it is impossible for an external event to be dropped, the concept of a partial load must be developed. A partial load $\delta(i,j)$ is the first time at which only tasks with priority lower than j are enabled, given that:

(a) task i completes execution at time 0, (b) no tasks other than i are enabled just before i completes execution, and (c) no external tasks execute in the interval $[0,\delta(i,j)]$ (other than possibly i completing execution at time 0).

An equivalent way of defining partial load $\delta(i,j)$, where i is an internal task, is as follows: the duration of a continuous sequence of executions of internal tasks having respective priorities not less than j, the sequence, commencing upon completion of task i, wherein none of the internal tasks, except task i, is enabled immediately before completion of task i and none of the external tasks completes execution during the sequence.

An equivalent way of defining partial load $\delta(i,j)$, where i is an external task, is as follows: the duration of a continuous sequence of executions of internal tasks having respective priorities not less than j, the sequence commencing upon completion of task i, wherein none of the internal tasks is enabled immediately before completion of task i and none of the external tasks completes execution during the sequence (excluding, of course, task i at the start of the sequence).

One technique for determining partial loads is by simulation. A more efficient technique for determining partial loads is provided by the following procedure (whose execution time is proportional to the square of the number of system tasks) comprising steps A–C:

A. Label each internal task i with the set of labels $L_i$ as follows:

for each internal task $i \in T$ in reverse topological order

1. $P := \bigcup_{(i,j) \in E} L_j$ /* $P = \emptyset$ if $i$ has no successors */

2. $Q := \{(j, w) \in P \mid j > i\}$

3. $L_i := (P - Q) \cup \left\{\left(i, \epsilon(i) + \sum_{(j,w) \in Q} w\right)\right\}$ end for each B. For each external task $i \in U$ let $L_i = \bigcup_{(i,j) \in E} L_j$, C. Compute partial loads by $\delta(i, j) = \sum_{(k,w) \in W} w$, where $W = \{(k, w) \in L_i \mid k \geq j\}$, assuming that $\delta(i, j) = 0$ if $W$ is empty.

Applying the above technique to the system of FIG. 1B would result in the following labels (using one possible reverse topological order of computation, i.e., 3,4,2,5,1):

$L_3 = \{(3,2)\}$
$L_4 = \{(4,1), (3,2)\}$
$L_2 = \{(2,4)\}$
$L_5 = \{(5,2), (4,1), (3,2)\}$
$L_1 = \{(1,11)\}$
$L_7 = L_1 = \{(1,11)\}$
$L_6 = L_2 = \{(2,4)\}$

Using the above labels, the partial loads can be determined according to step C above. For example, $\delta(7,1)=11$ and $\delta(6,1)=4$.

Figure 4A:
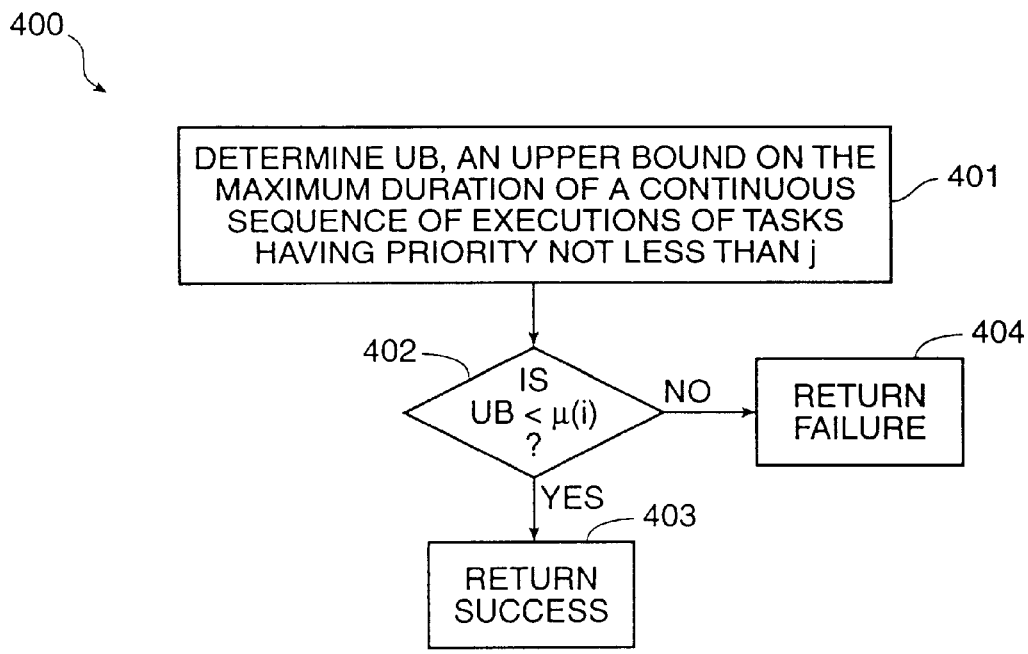
FIG. 4A is a flowchart for a technique to determine whether it is impossible for a particular external event to be dropped in a system using preemptive static priority scheduling.

FIG. 4A is a flowchart showing a technique 400 to determine whether it is impossible for an external event (i,j) to be dropped in a system using preemptive static priority scheduling. Initially, the technique determines an upper bound on a maximum duration, over all executions of the system, of a continuous sequence of executions of tasks having priority not less than j (step 401). Then the upper bound is compared against the minimum time between completions of external task i, $\mu(i)$ (step 402). If the upper bound is less than $\mu(i)$, then it is determined that event (i,j) cannot be dropped (step 403). Otherwise, processing terminates with an inconclusive result, i.e., it may or may not be possible for event (i,j) to be dropped (step 404).

Figure 4B:
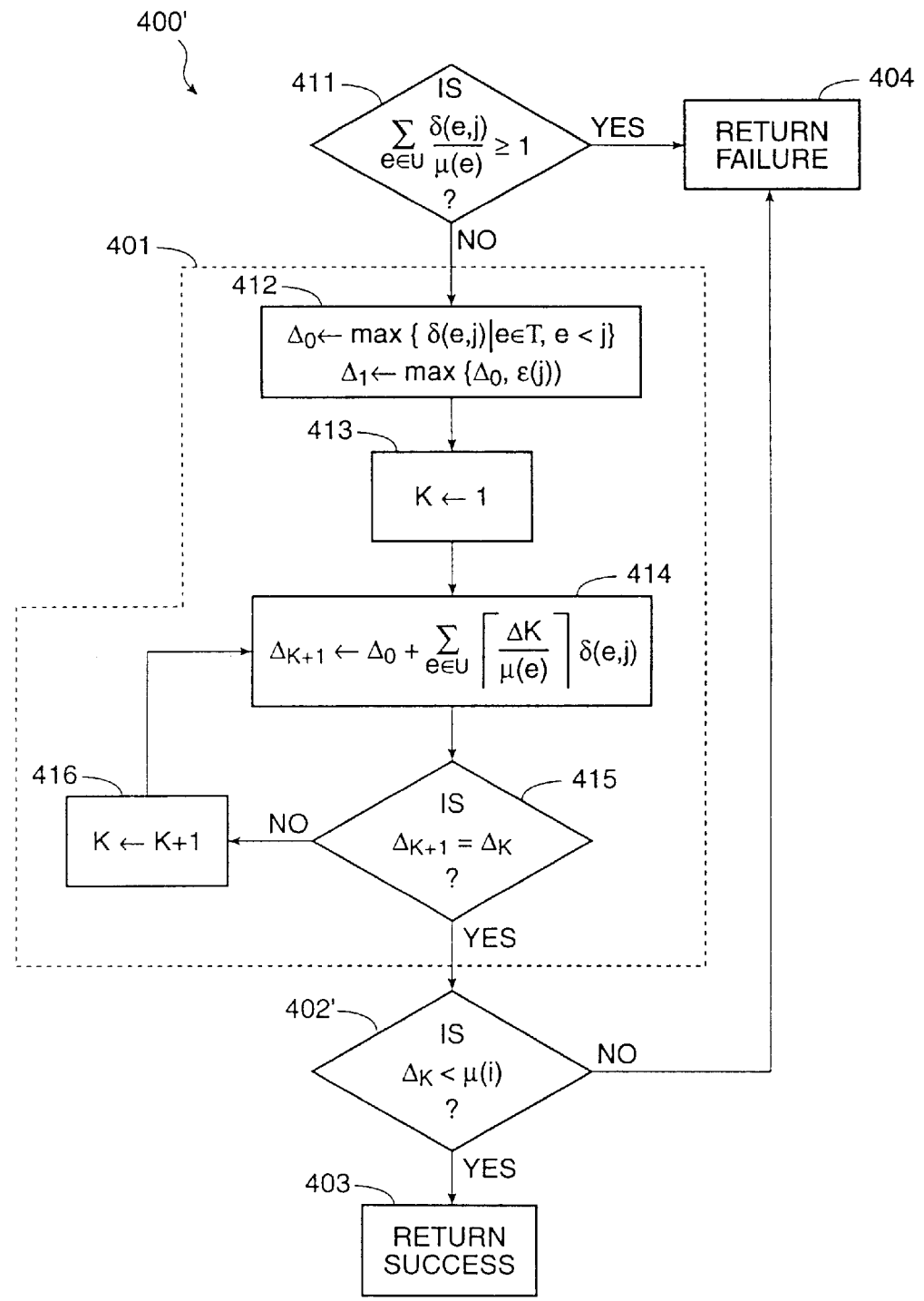
FIG. 4B is a more detailed flowchart for the technique of FIG. 4A.

FIG. 4B is a more detailed flowchart showing a technique 400' for determining whether it is impossible for an external event (i,j) to be dropped in a system using preemptive static priority scheduling, and, in particular includes substeps (412–416) for step 401 of FIG. 4A. The time required to execute the technique of FIG. 4B is polynomial in the number of system tasks. The technique includes an iterative determination of an upper bound, $\Delta$, on the maximum duration, over all executions of the system, of a continuous sequence of executions of tasks having priority not less than j (steps 414–416). Initially, in step 411 the technique tests for a condition whose satisfaction guarantees that the iteration of steps 414–416 will converge. If the condition is not satisfied, then processing terminates with an inconclusive result, i.e., it may or may not be possible for event (i,j) to be dropped (step 404). Otherwise, two quantities, $\Delta_0$ and $\Delta_1$, are determined (step 412).

$\Delta_0$ represents the maximum duration, occurring in any execution of the system, of a continuous sequence of executions of internal tasks having priority not less than j that can occur upon completion of an internal task of priority less than j, assuming that none of the internal tasks, except the internal task of priority less than j, is enabled immediately before the continuous sequence of executions commences and no external task completes execution during the sequence. ($\Delta_0$ is zero if the completion of no task of priority less than j enables a task of priority not less than ji) $\Delta_1$ represents the initial value assigned to the upper bound described above. The particular initial value chosen is not critical, but it should be a small positive number.

An updated value for the upper bound described above is computed as the sum of $\Delta_0$ and a series of respective terms corresponding to the external tasks (step 414). The term corresponding to each external task, e, is the product of first and second quantities. The first quantity, $\lceil \Delta_k/\mu(e) \rceil$, represents the maximum number of times external task e can complete execution within a time period of a duration equal to the last value determined for the upper bound described above. The second quantity, $\delta(e,j)$, represents a duration of a continuous sequence of executions of one or more of the internal tasks of priority not less than j occurring upon completion of external task e, assuming that no internal task is enabled immediately before the continuous sequence of executions commences and no other external task completion occurs during the sequence.

If the updated value for the upper bound is not equal to the last value determined for the upper bound, a new updated value is determined (steps 415, 416, 414). Otherwise, the final value for the upper bound is compared against the minimum time between completions of external task i, $\mu(i)$ (step 402'). If the upper bound is less than $\mu(i)$, then it is determined that event (i,j) cannot be dropped (step 403). Otherwise, processing terminates with an inconclusive result, i.e., it may or may not be possible for event (i,j) to be dropped (step 404).

Applying the technique of FIG. 4B to the system of FIG. 1B yields the following computations:

$\Delta_0=0$, (step 412)

$\Delta_1=2$, (step 412)

$\Delta_{k+1}=\Delta_0+\lceil \Delta_k/\mu(7) \rceil \delta(7,1)+\lceil \Delta_k/\mu(6) \rceil \delta(6,1)$ (step 414)

($\delta(7,1)=11$ and $\delta(6,1)=4$, as determined above)
The above iteration converges with $\Delta_3=\Delta_4=19$. Since 19 is less than $\mu(7)=20$, it is determined that event (7,1) cannot be dropped.

Figure 5A:
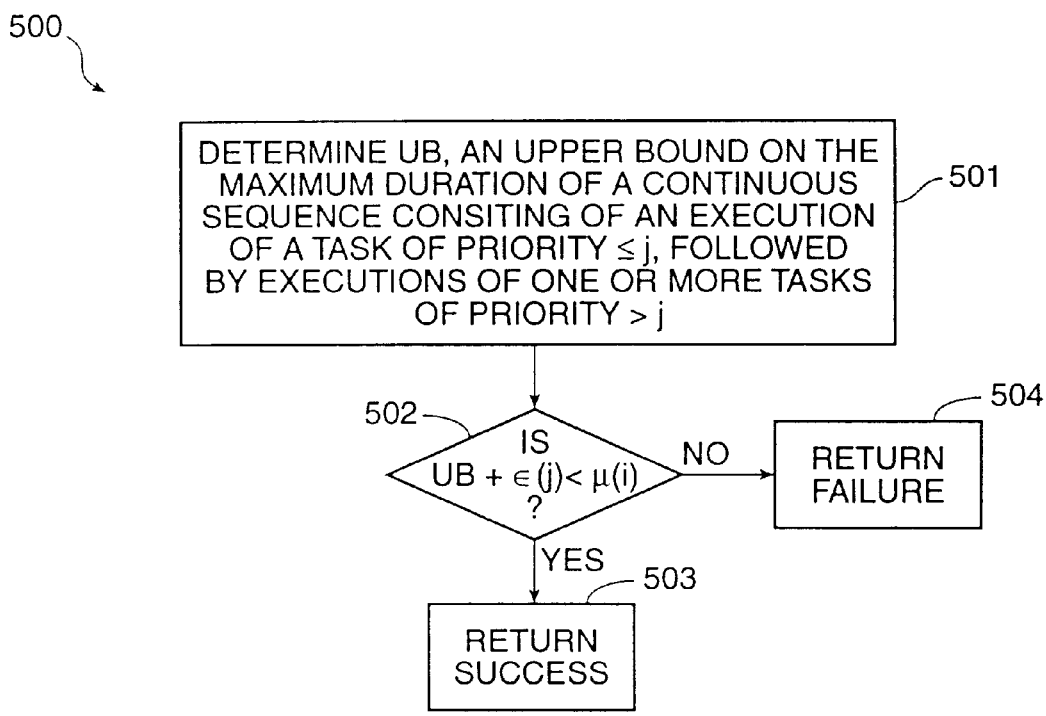
FIG. 5A is a flowchart for a technique to determine whether it is impossible for a particular external event to be dropped in a system using non-preemptive static priority scheduling.

FIG. 5A is a flowchart showing a technique 500 for determining whether it is impossible for an external event (i,j) to be dropped in a system using non-preemptive static priority scheduling. Initially, the technique determines an upper bound on a maximum duration of any continuous sequence of task executions occurring in any execution of the embedded system wherein the sequence consists of an execution of any one of the internal tasks having a priority not greater than j, followed by respective executions of one or more of the internal tasks having priority greater than j (step 501). Then the sum of the execution time for internal task j, $\epsilon(j)$, and the upper bound is compared against the minimum time between completions of external task i, $\mu(i)$ (step 502). If the sum is less than $\mu(i)$, then it is determined that event (i,j) cannot be dropped (step 503). Otherwise, processing terminates with an inconclusive result, i.e., it may or may not be possible for event (i,j) to be dropped (step 504).

Figure 5B:
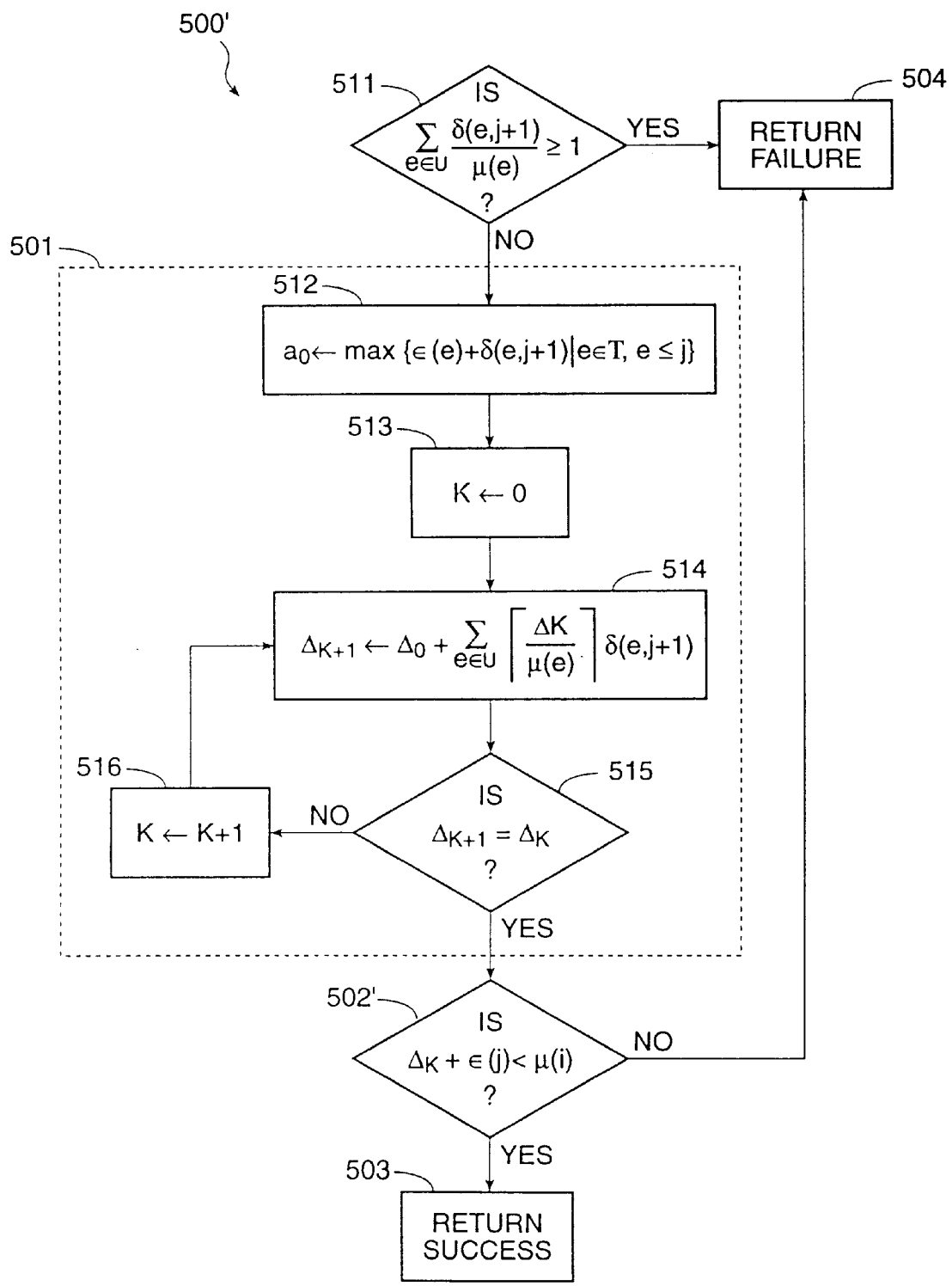
FIG. 5B is a more detailed flowchart for the technique of FIG. 5A.

FIG. 5B is a more detailed flowchart showing a technique 500' for determining whether it is impossible for an external event (i,j) to be dropped in a system using non-preemptive static priority scheduling and, in particular, includes substeps (512–516) for step 501 of FIG. 5A. The time required to execute the technique of FIG. 5B is polynomial in the number of system tasks. The technique includes an iterative determination of an upper bound, $\Delta$, on the maximum duration, over all executions of the system, of a continuous sequence of executions of tasks wherein the sequence consists of a first execution corresponding to a task having a priority not greater than j and zero or more executions corresponding to tasks having a priority greater than j (steps 514–516). Initially, in step 511 the technique tests for a condition whose satisfaction guarantees that the iteration of steps 514–516 will converge. If the condition is not satisfied, then processing terminates with an inconclusive result, i.e., it may or may not be possible for event (i,j) to be dropped (step 504). Otherwise, the quantity $\Delta_0$ is determined (step 512).

$\Delta_0$ represents the maximum duration, occurring in any execution of the system, of a continuous sequence of executions of internal tasks, wherein the first execution in the sequence is for a task of priority no greater than j, the rest of the executions in the sequence are for tasks of priority greater than j, and no external task completes execution during the sequence. $\Delta_0$ is also chosen to be the initial value assigned to the upper bound described above. The particular initial value chosen is not critical, but it should be a small positive number.

An updated value for the upper bound described above is computed as the sum of $\Delta_0$ and a series of respective terms corresponding to the external tasks (step 514). The term corresponding to each external task, e, is the product of first and second quantities. The first quantity, $\lceil \Delta_k/\mu(e) \rceil$, represents the maximum number of times external task e can complete execution within a time period of a duration equal to the last value determined for the upper bound described above. The second quantity, $\delta(e,j+1)$, represents a duration of a continuous sequence of executions of one or more of the internal tasks of priority greater than j occurring upon completion of external task e, assuming that no internal task is enabled immediately before the continuous sequence of executions commences and no other external task completion occurs during the sequence.

If the updated value for the upper bound is not equal to the last value determined for the upper bound, a new updated value is determined (steps 515, 516, 514). Otherwise, the sum of the final value for the upper bound and the execution time for internal task j, $\epsilon(j)$, is compared against the minimum time between completions of external task i, $\mu(i)$ (step 502'). If this sum is less than $\mu(i)$, then it is determined that event (i,j) cannot be dropped (step 503). Otherwise, processing terminates with an inconclusive result, i.e., it may or may not be possible for event (i,j) to be dropped (step 504).

The methods of the present invention are typically implemented as software programs executing on a general purpose computer such as a workstation or personal computer. Suitable computers can be acquired from many vendors, including Sun Microsystems, Silicon Graphics, IBM, and Hewlett-Packard. The configurations of such computers are well known in the art and will not be described here.

Conclusion

The above description is illustrative and not restrictive. For example, use of the invention is not limited to embedded systems, but rather is equally applicable to any system in which various tasks are executed on a processor, and each task is enabled for execution in response to the occurrence of an external event and/or the completion of another task. The scope of the invention should, therefore, be determined not with reference to the above description, but instead should be determined with reference to the appended claims along with their full scope of equivalents.

What is claimed is:

1. In a system represented by a graph, the system including a processor, a set of n internal tasks which execute on the processor according to static priority scheduling, and a set of external tasks, the $m^{th}$ internal task being designated internal task m for $1 \leq m \leq n$ with internal task m having a priority of m, the graph including a respective node representing each of the internal and external tasks, the graph including a directed edge from any first one of the nodes to any second one of the nodes if and only if, in the system, completion of the task represented by the first node enables the task represented by the second node, one of the directed edges in the graph going from the node representing internal task i to the node representing internal task j, defining an event (i,j), a computer-implemented method for determining, if for all possible executions of the system, it is impossible, after internal task i has completed execution, for internal task i to complete execution again before internal task j has completed execution, the method comprising the steps of:

(a) determining if any particular one of the external tasks satisfies a first condition, wherein the first condition is that there exists in the graph a path of priority greater than j between the node representing the particular external task and the node representing internal task i, the path of priority greater than j being a path each of whose nodes represents a task having priority greater than j;

(b) determining if any particular one of the internal tasks satisfies a second condition, wherein the second condition is that there exists in the graph at least two paths of priority greater than j between the node representing the particular internal task and the node representing internal task i; and (c) if it is determined that none of the external tasks satisfies the first condition and none of the internal tasks satisfies the second condition, providing an indication that, for all possible executions of the system, it is impossible, after internal task i has completed execution, for internal task i to complete execution again before internal task j has completed execution, thereby indicating that event (i,j) of the system is not dropped.

2. The method of claim 1 wherein step (a) and step (b) are intermingled as the nodes are traversed.

3. In a system including, a processor, a set of n internal tasks which execute on the processor according to preemptive static priority scheduling, and a set of external tasks, the $m^{th}$ internal task being designated internal task m for $1 \leq m \leq n$ with internal task m having a priority of m, completion of an external task i enabling internal task j, $1 \leq j \leq n$, there existing a minimum time between executions of the particular external task i, defining an event (i,j), a computer-implemented method for determining, if for all possible executions of the system, it is impossible, after external task i has completed execution, for external task i to complete execution again before internal task j has completed execution, the method comprising the steps of:

(a) determining an upper bound on a maximum duration, over all executions of the system, of a continuous sequence of executions of tasks having priority not less than j; and (b) if the upper bound determined in step (a) is less than the minimum time between executions of the particular external task, providing an indication that, for all possible executions of the system, it is impossible, after external task i has completed execution, for external task i to complete execution again before internal task j has completed execution, thereby indicating that event (i,j) of the system is not dropped, wherein:

the system satisfies at least one of first and second conditions;

the first condition is that completion of at least one of the tasks enables at least two of the internal tasks; and the second condition is that at least one of the internal tasks is enabled by completion of either of at least two of the tasks.

4. The method of claim 3, wherein step (a) includes the steps of:

(a1) determining a maximum duration of any continuous sequence of executions of one or more of the internal tasks occurring in any execution of the system, wherein:

each of the one or more internal tasks has a priority of not less than j;

the continuous sequence of executions commences upon termination of any one of the internal tasks of priority less than j;

none of the internal tasks, except the any one internal task of priority less than j, is enabled immediately before the continuous sequence of executions commences; and none of the external tasks completes execution during the sequence;

(a2) initializing a first variable;

(a3) for each external task, generating a product of first and second quantities, the first quantity representing a maximum number of times the external task can complete execution within a time period of a duration equal to the first variable, the second quantity representing a duration of a continuous sequence of executions of one or more of the internal tasks occurring upon termination of the external task, wherein:

each of the one or more internal tasks has a priority of not less than j;

no internal task is enabled immediately before the continuous sequence of executions commences; and no external task completes execution during the sequence;

(a4) determining a value of a second variable, the value being equal to the sum of the maximum duration determined in step (a1) and each of the products generated in step (a3);

(a5) if the first and second variables are not equal, assigning the value of the second variable to the first variable and repeating steps (a3)–(a5); and (a6) setting the upper bound to the value of the second variable.

5. In a system including, a processor, a set of n internal tasks which execute on the processor according to non-preemptive static priority scheduling, and a set of external tasks, the $m^{th}$ internal task being designated internal task m for $1 \leq m \leq n$ with internal task m having a priority of m, completion of an external task i enabling internal task j, $1 \leq j \leq n$, defining an event (i,j), internal task j having an execution time, there existing a minimum time between executions of external task i, a computer-implemented method for determining, if for all possible executions of the system, it is impossible, after external task i has completed execution, for external task i to complete execution again before internal task j has completed execution, thereby indicating that event (i,j) of the system is not dropped the method comprising the steps of:

(a) determining an upper bound on a maximum duration of any continuous sequence of task executions occurring in any execution of the system wherein:

the sequence consists of an execution of any one of the internal tasks having priority no greater than j, followed by respective executions of one or more of the internal tasks having priority greater than j; and (b) if a sum of the upper bound determined in step (a) and the execution time of internal task j is less than the minimum time between executions of the particular external task, providing an indication that, for all possible executions of the system, it is impossible, after the particular external task has completed execution, for the particular external task to complete execution again before internal task j has completed execution, wherein:

the system satisfies at least one of first and second conditions;

the first condition is that completion of at least one of the tasks enables at least two of the internal tasks; and the second condition is that at least one of the internal tasks is enabled by completion of either of at least two of the tasks.

6. The method of claim 5, wherein step (a) includes the steps of:

(a1) determining a maximum duration of any continuous sequence occurring in any execution of the system, wherein:

the sequence consists of an execution of any one of the internal tasks having priority no greater than j, followed by respective executions of one or more of the internal tasks having priority greater than j, and none of the external tasks completes execution during the sequence;

(a2) initializing a first variable;

(a3) for each external task, generating a product of first and second quantities, the first quantity representing a maximum number of times the external task can complete execution within a time period of a duration equal to the first variable, the second quantity representing a duration of a continuous sequence of executions of one or more of the internal tasks occurring upon termination of the external task, wherein:

each of the one or more internal tasks has a priority of not less than j+1;

no internal task is enabled immediately before the continuous sequence of executions commences; and no external task completes execution during the sequence;

(a4) determining a value of a second variable, the value being equal to the sum of the maximum duration determined in step (a1) and each of the products generated in step (a3);

(a5) if the first and second variables are not equal, assigning the value of the second variable to the first variable and repeating steps (a3)–(a5); and (a6) setting the upper bound to the value of the second variable.

* * * * *